April 21, 1925.
W. L. MARDEN
SAND TRAP AND STRAINER
Filed June 13, 1923
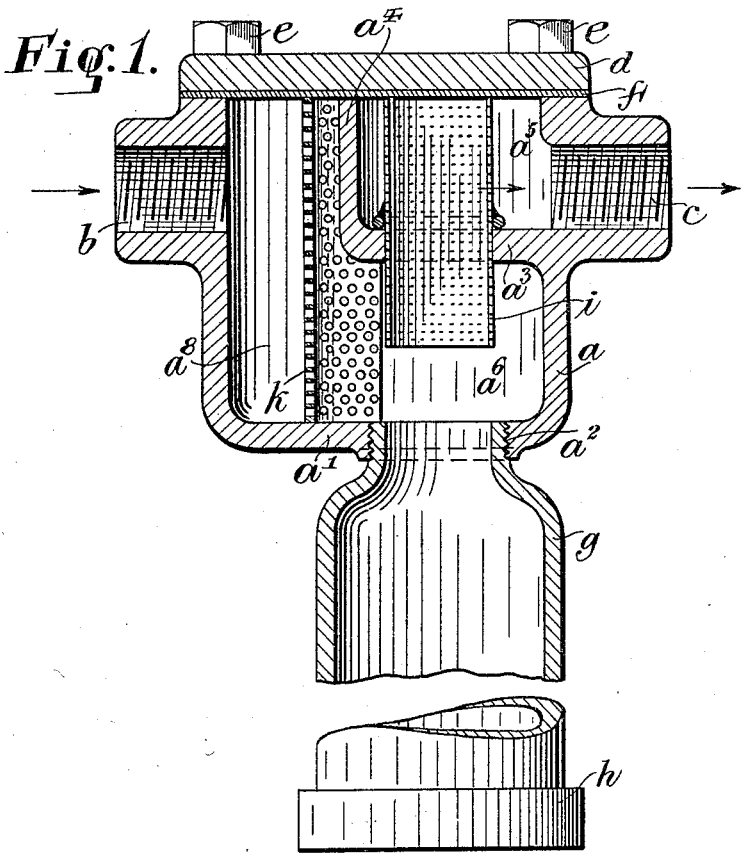
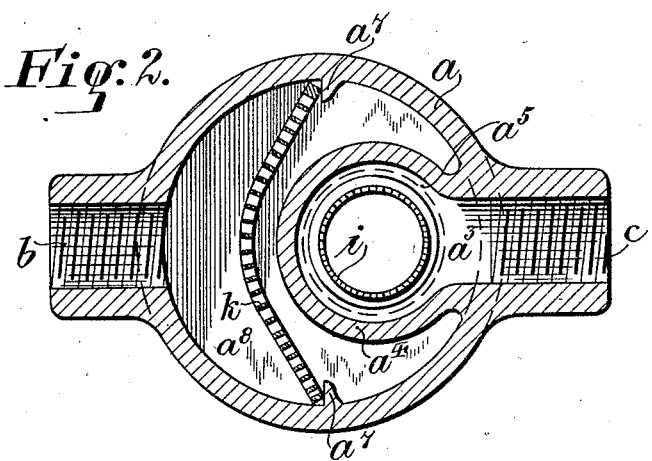

Patented Apr. 21, 1925.

1,534,129

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

SAND TRAP AND STRAINER.

Application filed June 13, 1923. Serial No. 645,212.

*To all whom it may concern:*

Be it known that I, WILLIAM L. MARDEN, a citizen of the United States, residing in the borough of Queens of the city of New York, in the State of New York, have invented certain new and useful Improvements in Sand Traps and Strainers, of which the following is a specification, reference being had to the accompanying drawing, forming a part hereof.

This invention has for its object to provide for the elimination of sand and other foreign substances from water as it passes on its way to meters, pumps, boilers, etc., which shall be highly efficient, shall not become clogged quickly, shall be capable of being cleaned readily when necessary, and shall be easy to manufacture. The invention will be fully described hereinafter with reference to the accompanying drawing in which it is illustrated and in which—

Figure 1 is a view partly in vertical section and partly in elevation of a sand trap and strainer which embodies the invention, a portion of the sand receptacle being broken out to save space.

Figure 2 is a view of the same in horizontal section on the plane of the axes of the inlet and outlet.

The improved sand trap and strainer comprises a vessel $a$, which may be of cast metal, substantially cylindrical, provided at $b$ with an opening which may be threaded for engagement with an outlet pipe. The open upper end of the vessel or casting $a$ is closed by a removable cap $d$, held by bolts $e$, and a gasket $f$, while the bottom $a'$ has an opening $a^2$, preferably threaded for engagement by a sand receiver $g$ which may have its lower end closed by a removable cap $h$. Within the vessel $a$ is formed a horizontal wall or partition $a^3$ and a vertical wall or partition $a^4$ which set off a chamber $a^5$ in free communication with the outlet $c$. The horizontal or transverse wall $a^3$ is formed with an opening in which is fitted closely a foraminous, preferably cylindrical strainer $i$ which at its upper end fits tightly against the gasket $f$ or the cap plate $d$ and at its lower end, within the chamber $a^6$ below the wall or partition $a^3$, is open. This strainer $i$ is not only vertical and projected downward within the chamber $a^6$, but is substantially aligned with the sand receiver $g$. Between the inlet $b$ and the strainer $i$ is disposed a more coarsely foraminous partition $k$ also preferably vertical, resting at its lower end on the bottom $a'$ of the main casting, bearing at its vertical edges against ledges $a^7$ formed on the inner surface of the main casting $a$, and in contact at its upper end with the gasket $f$ or cap $d$.

In the use of the strainer the relatively larger and lighter foreign substances which may be brought in with the water are caught by the strainer $k$ and are retained within the inlet chamber $a^8$, being thereby prevented from passing on with the water and from clogging the finer strainer $i$. The water which passes through the strainer $k$, carrying with it the finer particles of greater specific gravity, as of sand, has its velocity checked as it passes through the strainer $k$, has its direction of flow changed from the horizontal and downward to an upward direction and has an opportunity to circulate or eddy in the chamber $a^6$, thereby facilitating the deposit of such particles and their accumulation in the sand receiver $g$. From the chamber $a^6$ the water, carrying the still finer particles of heavier material which have not been deposited, passes upward into the interior of the strainer $i$, and eventually passes through the foramina of this strainer into the chamber $a^5$ above the horizontal or transverse partition $a^3$ and so to the outlet $c$. The finer particles which are prevented from passing through the strainer $i$ slip down the vertical wall of the strainer and fall therefrom into the still water of the receiver $g$. Such sand or other heavy material as accumulates in the receiver $g$ can be blown out from time to time upon the removal of the cap $h$ and both strainers $i$ and $k$ can be cleaned as required upon the removal of the cap $d$ and gasket $f$. When the flow of water is cut off, during the cleaning of the strainer, such particles of the relatively lighter material as may have been stopped by the strainer $k$ will settle in the chamber $h$, which can be cleaned out readily as by the removal of the strainer and the pushing forward of the material into the mouth of the receiver $g$. Both the strainer $i$ and the strainer $k$ can be lifted out, when the cap $d$ is removed, for the purpose of permitting them to be cleaned more readily if desired.

I claim as my invention:

A sand trap and strainer comprising a vessel having an inlet and an outlet, an open top with a removable cap and a discharge opening in its bottom, a transverse and vertical partition forming a chamber within the main vessel, a finely foraminous, substantially cylindrical strainer supported in the transverse partition and having its lower end open and its upper end in contact with the removable cap and a coarsely foraminous partition interposed in the main vessel between the inlet and the finely foraminous strainer and bearing at its lower end against the bottom of the main vessel, at its vertical edges against the sides of the main vessel, and at its upper edge against the removable cap.

This specification signed this 8 day of June A. D. 1923.

WILLIAM L. MARDEN.